C. MOSS.
NON-SKID AND ARMOR DEVICE FOR AUTOMOBILE TIRES.
APPLICATION FILED JUNE 7, 1916.
1,314,145.
Patented Aug. 26, 1919.
3 SHEETS—SHEET 1.
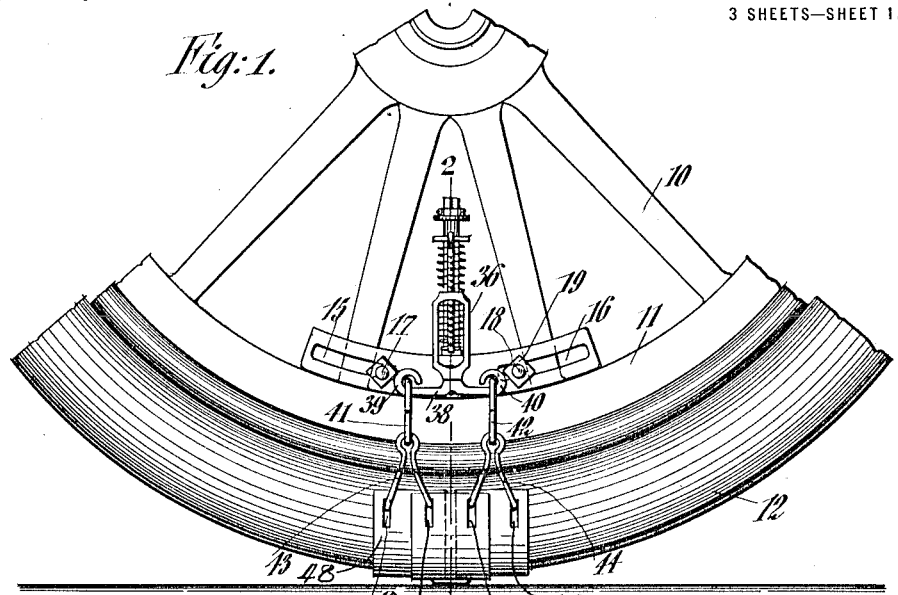
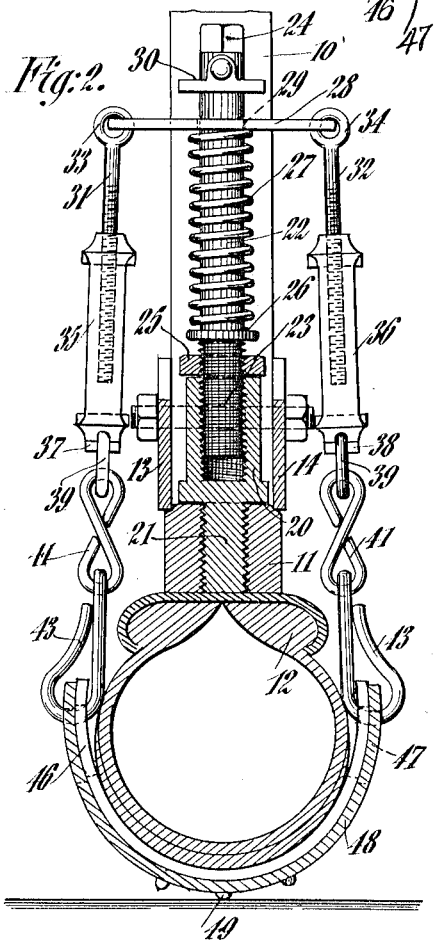
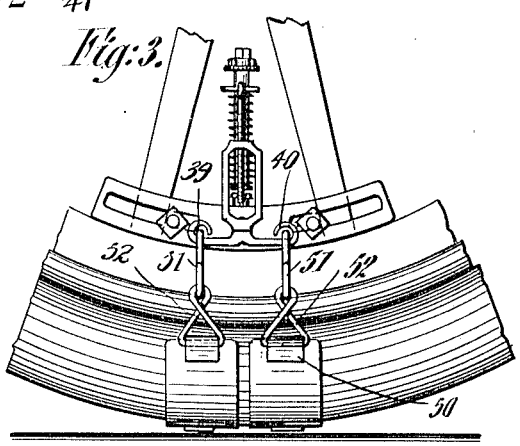
INVENTOR
Charles Moss
BY Earl P. Toepel
ATTORNEY C. MOSS.
NON-SKID AND ARMOR DEVICE FOR AUTOMOBILE TIRES.
APPLICATION FILED JUNE 7, 1916.
1,314,145.
Patented Aug. 26, 1919.
3 SHEETS—SHEET 2.
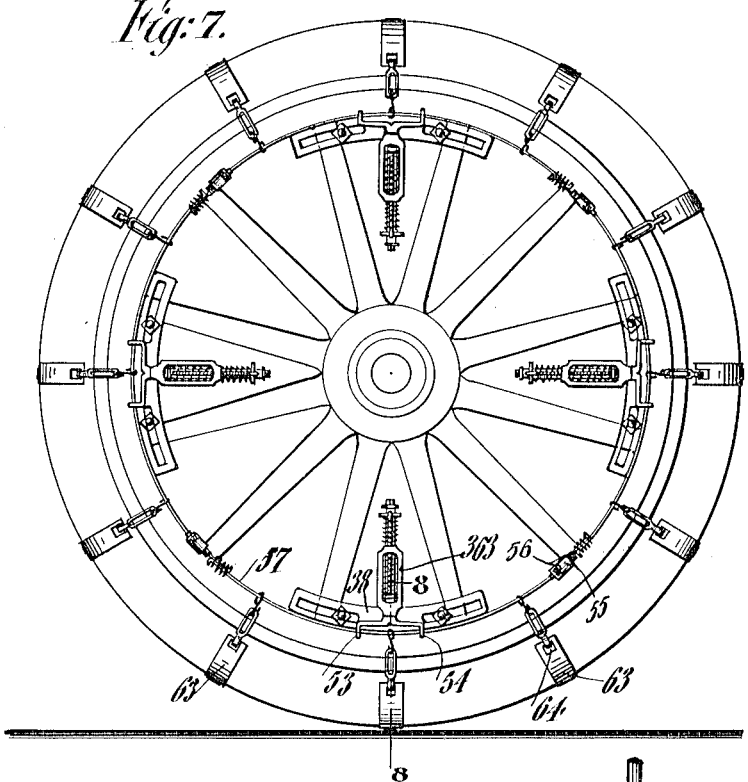
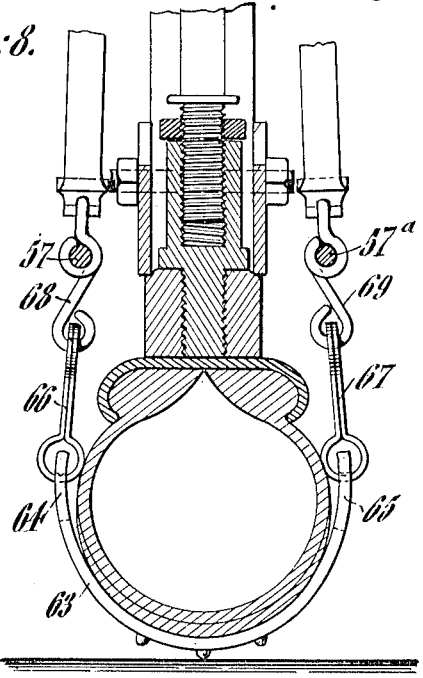
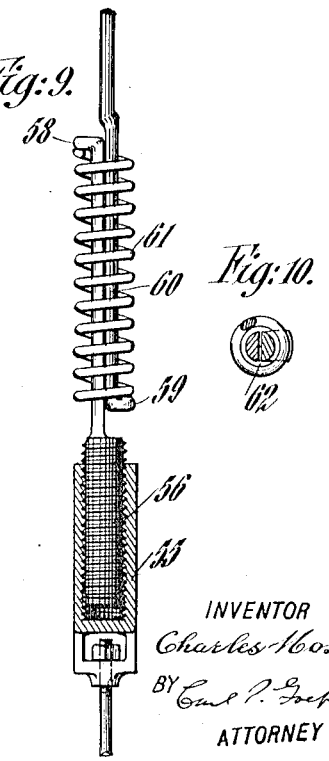
INVENTOR
Charles Moss.
BY
ATTORNEY

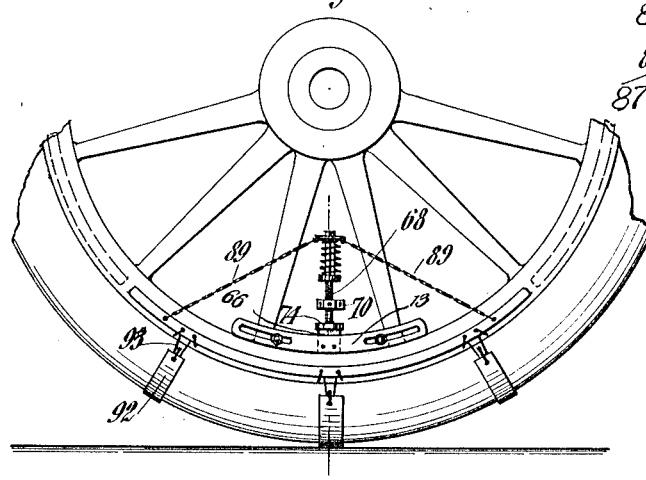
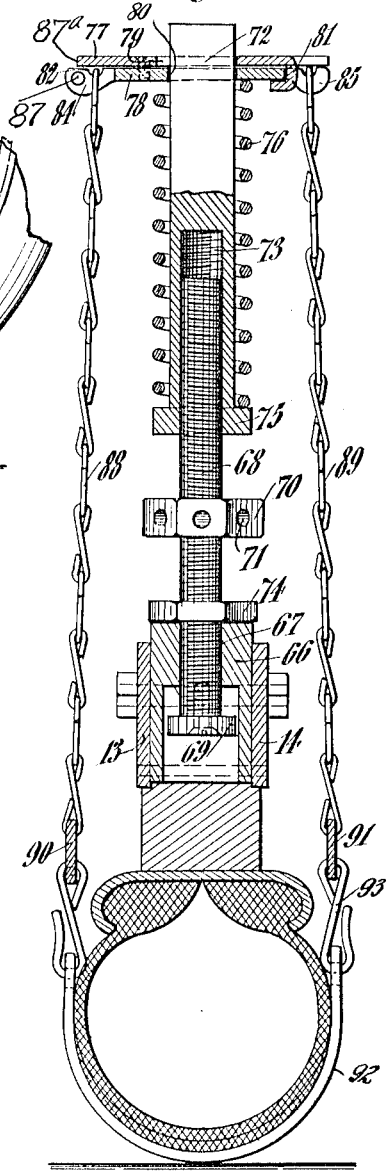

UNITED STATES PATENT OFFICE.

CHARLES MOSS, OF NEW YORK, N. Y.

NON-SKID AND ARMOR DEVICE FOR AUTOMOBILE-TIRES.

1,314,145.  Specification of Letters Patent.  Patented Aug. 26, 1919.

Application filed June 7, 1916. Serial No. 102,118.

*To all whom it may concern:*

Be it known that I, CHARLES MOSS, a citizen of the Kingdom of Roumania, residing in New York, in the borough of Manhattan, city and State of New York, have invented certain new and useful Improvements in Non-Skid and Armor Devices for Automobile-Tires, of which the following is a specification.

The present invention relates to improvements in non-skid and armor devices for automobile tires, and is an improvement over my invention disclosed in U. S. Patent No. 1,161,507, of November 23, 1915. An object of the present invention is to provide such a device which may be applied to cover a desired area of the tire surface to meet different conditions, and will not be injurious or affect in any way the running qualities of the tire. A further object is to provide such a device which will be readily attachable to the tire, and detachable therefrom, and will conform in its action to the various forces exerted on the tire, such for instance as running over stones or other obstacles, thereby forming an armor which in its effect constitutes an inherent part of the tire itself. A still further object is to enable the replacement of any of the portions of the device should the same become broken or unfit for use, without disturbing the remainder of the device, and without loss of use of the machine for any considerable time.

With these and other objects in view, my invention is shown in the accompanying drawings and will be hereinafter more fully described with reference thereto, and finally pointed out in the claims.

In the accompanying drawings,

Figure 1 is a side view of a portion of an automobile wheel and tire, showing my invention applied thereto, Fig. 2 is a sectional view along the line 2—2 of Fig. 1, Fig. 3 shows a portion of the wheel and tire, with a modified form of my invention applied thereto, Figs. 4, 5 and 6 are respectively edge, side and plan views of the tread portion, Fig. 7 shows an automobile wheel and tire with a further modified form of my invention applied thereto, in which the device extends entirely around the wheel.

Fig. 8 is a sectional view along the line 8—8 of Fig. 7,

Figs. 9 and 10 are detail views of the ring employed in this form of my invention, Fig. 11 shows a portion of a wheel and tire with a still further modified form of my invention applied thereto, Fig. 12 is a sectional view along the line 12—12 of Fig. 11, Fig. 13 is a plan view of the adjustable plate and associated parts, Fig. 14 shows a wrench employed in applying the device to the tire, and Fig. 15 shows a still further modified form especially intended for wire wheels, in which the use of the special connections to the rim are dispensed with.

Similar reference characters indicate corresponding parts throughout the several figures of the drawings.

Referring to the drawings, and more particularly to Figs. 1 and 2 thereof, the automobile wheel comprising spokes 10, a felly 11 and tire 12 is provided on each side of two adjacent spokes with arcuate plates 13 and 14, having at the ends thereof slots 15 and 16, through which bolts 17 and 18 provided at their ends with nuts 19 are placed in order to tightly clamp the said plates on the sides of the spokes. An interiorly threaded socket member 20 provided with a shank 21 is screwed into the felly of the wheel between the said plates, a shaft 22 radial with respect to the wheel, provided at one end with screw threads 23, and at the other end with a squared head 24 is screwed into the interiorly threaded portions of the socket member by applying a wrench to the squared head 24. A washer 25 is provided on the threaded portion 23 of the shaft for engaging the radially inward end of the socket member 20, and a flange 26 is provided on the inward end of the threaded portion thereof. A spring 27 is disposed on the shaft between this flange 26 and a slidable plate 28 provided with a hole 29 therein which engages the shaft, a collar 30 being secured near the radially inward extremity of the shaft to limit the movement of the said plate 28 in one direction.

At each side of the plate 28 there are provided screws 31 and 32 having eyelets 33 and 34, which engage the said plate. Engaging the threaded portion thereof there are provided tightening links 35 and 36 provided at their free ends with swivelly connected members 37 and 38, which extend outwardly at each side thereof, and are provided at their outer ends with hooked portions 39 and 40, connected by links 41 and 42 to supporting members 43 and 44 formed into a plurality of hooks at their ends, which engage openings 46 and 47 at the respective sides of the tread 48. The tread in this embodiment comprises three such members, two openings 46 and 47 being provided at each end as above stated, the openings of the central or over-lapping member registering with, or coinciding with the inner openings of the outer members. The member 48 is provided with studs or ridges 49 in order to provide a non-skid surface. This tread portion may be of metal, leather, rubber, fiber, or other suitable material. After the device is placed upon the tire, at which time the shaft 22 is moved radially inward by engagement of a suitable wrench with the end 24 which increases the tension of the spring 27, and exerts a pulling force on the connected links between the plate 28 and the tread, thereby causing the tread to hug the tire tightly.

Should the tread engage any obstructions in the road, depressing the same with the tire, the spring 27, will retain the tread in its tight relation with the tire, thereby preventing stones or the like from entering between the tire and the tread. As many such devices as shown in Figs. 1 and 2, it will be understood, may be applied to the tire as desired.

In the modified form of construction shown in Fig. 3, the treads do not over-lap as shown in the first form of my invention, and are provided in pairs having hook shaped portions 50 provided at their ends. These treads are each connected to the hooked shaped ends 39 and 40 of the members 37 and 38 by means of two figure eight links 51 and 52.

In Figs. 7 to 10 I have shown a still further modified form in which the single tread portions are provided in spaced relation around the tire. Preferably four holding devices such as shown in the first form of my invention are employed, the swivel members 38 being provided with eyelets 53 and 54 instead of with hooked portions. Wire rings 57, 57ª extend around the wheel at each side thereof, passing through the eyelets 53 and 54 of the swivel members 38. These rings are provided at their respective ends with swivel portions 55 and screw portions 56, such as shown in Fig. 9, the tread portion of one being screwed into the swivel portions of the other. The members are made resilient by forming the same in two portions, the ends of each being bent outwardly as at 58 and 59, and over-lapping as at 60, a spring 61 being provided over the over-lapping portions, and engaging the ends 58 and 59. The over-lapping ends are preferably formed into semi-circular cross-section as indicated at 62, in Fig. 10. The tread members 63 which are provided in their ends with openings 64 and 65 are connected by means of chain links 66 and 67, and short double eyelet links 68 and 69 to the rings 57, 57ª. As many of these tread members may be provided as desired. For non-skid purposes, however, a number substantially corresponding to that shown will suffice.

In Figs. 11 to 13 I have shown a further modified form for employing a plurality of single tread portions, and which dispenses with the encircling rings 57 and 57ª as shown in Figs. 7 to 10. Between the plates 13 and 14 there is secured a member 66 provided at its radially inward portion with a threaded opening 67, through which a threaded shaft 68 is inserted, an enlarged member 69 being secured to the end of the shaft to prevent its removal from the member 66. This shaft is provided centrally with a nut 70, non-rotatably secured thereto, and having in each face of the nut holes 71 for insertion of a rod or the like for turning the shaft. The threads of the shaft extending at either side of the nut are right and left threads, and a squared rod 72 provided with an interiorly threaded opening 73 engages the threads at one side of the screw so that by turning in either direction from the shaft, the member 72 is moved toward or away from the periphery of the wheel, as the case may be, and at the same time the shaft 68 moves in the same direction. A nut 74 is provided on the shaft 60 at the rim side of the nut 70, and engages the member 66.

The squared rod 72 is provided at one end with a flange 75, and a spring 76 is disposed upon said rod and rests on said flange. A pair of interlocking plates 77 and 78 are mounted upon the rod 72 at the end of the spring 76, and are provided with squared openings 79 and 80 therein respectively, which engage the said rod. The plate 77 is provided at one end with a hooked portion 81, which engages the end of the plate 78, the opening 79 of this plate being larger and being longer than the opening of the plate 78 to permit engagement of this hooked portion when so connected. The two plates are secured together by screws 82 and 83. The plate 78 is provided at its corners with projecting portions 84 and 85 at the respective ends thereof, having depressions 86 therein, the extensions 84 being provided at their outer sides with lugs or pins 87. Chains 88 and 89 are engaged in the said depressions 86, and are held in place by extending portions 87ª at the corners of the plate 77. These chains 88 and 89 are connected at their ends with arcuate plates 90 and 91, which extend around a portion of the wheel, and a plurality of tread members 92 are connected to these plates by means of links 93.

This form of my invention is applied to the wheel in the following manner: The chains 88 and 89 of one side of the wheel are connected to the plate 78, the plate 77 being unattached and in such position as to uncover the depressions 86 of the extensions 84. A wrench 100 shown in Fig. 14 is then engaged with the pins 87, and the plate is forced downwardly, and at the same time the chains 88 and 89 on the other side of the wheel are engaged with the depressions 86 of the extensions 84, the plate 77 is then moved into place so that the depressions 86 are closed, and the same is secured in place, the tread is then tightened upon the tire by engagement of the rod or wrench with the nut 70, and turning the same so that the rod 72 is moved away from the periphery of the wheel.

In Fig. 15 I have illustrated a form of construction especially intended for use with wire wheels, and in which the special connection for the rim is dispensed with. A plurality of circumferential plates 150, similar in form to the plates shown in Fig. 11, are provided circumferentially about the rim at each side, and are provided at their ends with a plurality of holes 152, 153, right angular brackets 154 and 155 being swivelly secured at the ends by means of bolts 156, 157 passing through holes 158, 159 therein and through one of the holes 152, 153 at the ends of the plates. Threaded openings 160, 161 are provided in the brackets, and spring connecting members 162 having oppositely threaded portions 163 and 164 at the ends, which engage the openings 160, 162. By turning these spring connecting members, in one or the other directions, the ring formed by the plates may be tightened or loosened and the angular brackets may be adjusted by securing to the different holes 152, 153. The spring member is similar in form to the spring connection shown in Fig. 9, comprising two over-lapping portions, bent outwardly at their ends 165, 166, and provided with a spring 167 abutting said turned out ends.

A plurality of tread portions 168 are secured to the rings by pivoted strap members 169.

This form of construction provides a very inexpensive and effective non-skid and armor device, which may be readily attached to any form of wheel, and particularly wire wheels, and may be quickly and conveniently attached to and removed from the wheel.

I have illustrated preferred and satisfactory forms of my invention, but it is obvious that changes may be made therein, within the spirit and scope thereof as defined in the appended claims.

I claim:

1. An improved non-skid and armor device for tires, comprising tread means adapted to engage the tire, a support on the rim, a longitudinally adjustable post on said support provided at one end with a shoulder, a plate slidable on said post, an expansive spring encircling said post and disposed between said plate and said shoulder, and adapted to exert a thrust on said plate away from said tread means, connecting means disposed between said plate and said tread, said spring adapted to tension said connecting means to yieldingly retain said tread on said tire, longitudinal adjustment of said post adapted to relieve the tension on said spring to permit ready disengagement of said tread from said tire.

2. An improved non-skid and armor device for tires, comprising a tread means adapted to engage the tire, a supporting means on the rim comprising a socket member, a shaft having right and left threads engaging said socket member at one end and a post engaging the other end of said shaft, a shoulder on said post, a plate slidable on said post, an expansive spring encircling said post, and disposed between said shoulder and said plate, connecting means disposed between said plate and said tread means, and means for enabling the rotation of said shaft, rotation of said shaft adapted to reduce the tension of said spring to permit ready disengagement of said tread means from said tire.

In testimony that I claim the foregoing as my invention, I have signed my name in presence of two subscribing witnesses.

CHARLES MOSS.

Witnesses:
D. Lewis Mattern,
Mae M. Weinberg.